US 7,363,025 B2

(12) United States Patent
Roberts et al.

(10) Patent No.: US 7,363,025 B2
(45) Date of Patent: Apr. 22, 2008

(54) HANDHELD DEVICE CONFIGURATOR

(75) Inventors: Chad Roberts, Redmond, WA (US); Troy W. Roberts, Woodinville, WA (US); Owen C. Stenseth, Kirkland, WA (US)

(73) Assignee: PDA Verticals, Corp., Kirkland, WA (US)

( * ) Notice: Subject to any disclaimer, the term of this patent is extended or adjusted under 35 U.S.C. 154(b) by 1194 days.

(21) Appl. No.: 10/092,259

(22) Filed: Mar. 7, 2002

(65) Prior Publication Data
US 2002/0165850 A1 Nov. 7, 2002

Related U.S. Application Data

(60) Provisional application No. 60/273,558, filed on Mar. 7, 2001.

(51) Int. Cl.
*H04M 11/10* (2006.01)
(52) U.S. Cl. .................. 455/412.2; 707/1; 455/466
(58) Field of Classification Search .................. 707/9, 707/10, 3, 100–203; 455/412
See application file for complete search history.

(56) References Cited

U.S. PATENT DOCUMENTS

| 6,115,547 | A | 9/2000 | Ghatate et al. |
| 6,343,299 | B1 | 1/2002 | Huang et al. |
| 6,430,730 | B1 | 8/2002 | Ghatate et al. |
| 6,457,076 | B1 | 9/2002 | Cheng et al. |
| 2002/0090934 | A1* | 7/2002 | Mitchelmore ............... 455/412 |

OTHER PUBLICATIONS

U.S. Appl. No. 60/252,409, filed on Nov. 22, 2000.*

* cited by examiner

Primary Examiner—Charles Rones
Assistant Examiner—Belix M Ortiz
(74) Attorney, Agent, or Firm—Dickstein Shapiro LLP

(57) ABSTRACT

A mechanism for configuring handheld devices is disclosed. The mechanism includes a website engine, a database, a build-to-order configuration engine, and a loader. Among other things, the built-to-order engine communicates with developers, coordinates software licenses, arranges software downloads and prevents conflicts. The loader provides actual downloads for loading the handheld device based on user input received through the website engine which conveys the user input to the database and built-to-order configuration engines. These software modules can be on the same computer, or can be divided among several computers.

19 Claims, 3 Drawing Sheets

HANDHELD DEVICE CONFIGURATOR

This application claims the benefit of provisional application 60/273,558 filed Mar. 7, 2001.

FIELD OF THE INVENTION

The invention relates to configuring handheld devices such as Palm Pilots with a software suite requested by a customer.

BACKGROUND OF THE INVENTION

A wide variety of handheld computing devices exist, many of which have different and incompatible ways of being configured and upgraded. The level of sophistication necessary to understand the details and nuances of these different devices is high. Consequently, a need exists for a mechanism capable of configuring handheld devices according to a multitude of user preferences.

BRIEF SUMMARY OF THE INVENTION

In a first embodiment of the invention, a mechanism for configuring handheld devices, includes a website engine, for receiving user input; a build-to-order configuration engine; for communicating with developers, coordinating software licensing, arranging software downloads and preventing conflicts; a database engine, for managing executable code and data responsive to the configuration engine, and a loading station; for performing the actual downloads. The loading station loads said handheld device based on user input received through the website engine and conveyed to the database and build-to-order configuration engines. In another embodiment, the configuration engine communicates automatically with handheld software product developers using a registration module. In another embodiment, the registration module communicates with the developers using either pooled, generated, or dynamically requested communications.

In yet another embodiment, the registration module supports either the random-key or device-ID method of software registration.

BRIEF DESCRIPTION OF THE DRAWING

The foregoing and other features and advantages of the invention will become more apparent from the detailed description of the exemplary embodiments of the invention given below in connection with the accompanying drawings in which.

DETAILED DESCRIPTION OF THE INVENTION

Figure 1:
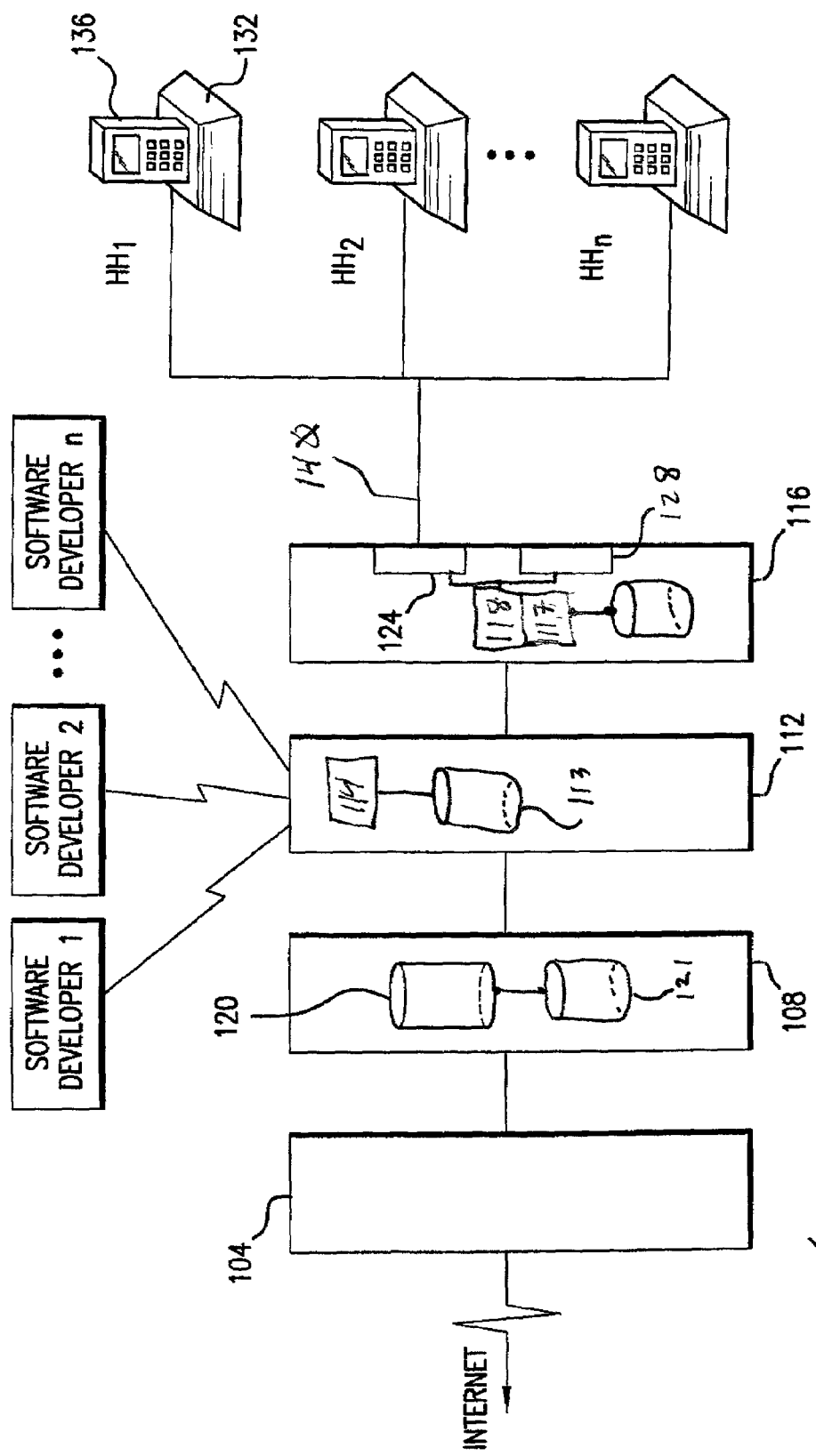
FIG. 1 is a block diagram of a the main elements of the present invention.

The present invention consists of basically four components: a website engine 104, a database engine 108, a build-to-order configuration engine 112, and a loading station 116. In FIG. 1, each of these components is shown running on a separate computer for scalability reasons, though from a design perspective all the components could be run from a single system if that system had sufficient processing power. In a preferred embodiment, the application software to support the above engines is compiled for the Linux operating system, although another Operating System (O/S) could also be used.

Although numerous configurations are contemplated within the present invention, in a preferred embodiment the website and configuration engines 104 and 112 have 1 GB RAM, Linux Operating System, an 18 GB fast SCSI disk, a fast network connection (i.e. 100 Mb/s), and a minimum of 800 MHz microprocessor. The fast network connection is important because website response times noticeable by an end user are affected by the speed of the network connection. The database engine should have a minimum of 1 GB Ram, Linux Operating System, a 18 GB fast SCSI disk, a Fast Network connection (i.e. 100 Mb/s), and a minimum of an 800 MHz microprocessor. Finally, the loader engine 116 should have 256 MB RAM, Linux Operating System, a 10 GB disk, a network connection (10Mb/s), a 700 MHz processor, and numerous high speed ports 124, 128 such USB or serial. It is less critical that the loader engine 116 have a high speed network connection as managing the high speed ports 124, 128 is a higher priority.

As stated, there is no specific requirement for the software engines of the present invention to run only on Linux. They could be ported to other flavors of Unix (Sun Solaris, HP/UX, etc) or to Windows NT. There would be some amount of changes required to the system to interface it to the Application Program Interfaces (APIs) that each of those platforms provides, but the system is not tied by design to Linux only. For example Linux and Windows NT both have different APIs for communicating to the serial ports so the portions of the loader 116 that talk to the port 124 would differ, but the part of the present invention that moves the data back and forth over that connection would stay the same.

The loading station 116 is generally indifferent to the specific types of physical connections illustrated in FIG. 1 by connection 140. The present invention can load hand held devices using Universal Serial Bus (USB), RS-232, Infra-Red (IR), FireWire, BlueTooth, as well as other connection media. The transfer component 117 of the loader 116 that actually transfers data back and forth over the physical medium 140 through port 124 has been abstracted such that it sees all of the different connection types as the same, because the operating system driver layer 118 handles the actual moving of the bits over the physical medium 140.

The number of devices that can be simultaneously supported is limited only by the number of ports on the loading station 116, and the number of loading stations. For example if a loading station has 32 serial ports then 32 devices could be loaded at once. Additionally, multiple loading stations can be used, so if a user had 3 loading stations each with 32 serial ports, that user could load 96 devices at once. In a preferred embodiment, Universal Serial Bus (USB) ports are employed partly because USB ports can support up to 127 individual devices, and partly because of the rate at which data can be transferred therein. In the diagram of FIG. 1, port 124 is shown supporting handheld devices $136_{1-n}$, while port 128 remains vacant. The handheld devices $136_{1-n}$ communicate with port 124 through cradles $136_{1-n}$, over physical medium 140.

The rate at which the various handheld devices can be loaded is limited by the physical connection 140. As stated, a preferred embodiment uses USB due to its speed, although the ability to easily add USB ports to the system is a factor. The single most significant criteria for which type of serial port to use is the rate at which the desired software can be transferred onto the device. A typical handheld device can be loaded about 40% faster using USB than through a typical serial port.

The loading station 116 as a whole does not care about what type of handheld device is connected, and in fact was designed to seamlessly support the addition of new types of handheld devices as the market evolves. The loading station 116 communicates over the physical connection (i.e. USB, serial, etc) to the device through a specialized software transfer component or protocol stack 117. These specialized modules 117 can be added to or removed from the loading station 116 as required, much like a driver for a new video card on a PC. Like device drivers, the modules abstract the actual communications protocol by which a handheld device communicates with a loading station 116, so that the transfer component 117 only has to worry about transferring files to and from the device, while the O/S component driver 118 determines what kind of handheld device is being loaded and how to communicate with it. Examples of O/S components that can be loaded in the present invention include bur are not limited to PalmOS drivers, PocketPC drivers, Psion/Symbian drivers, cellular phone drivers, as well as other handheld device drivers.

Manufacturers of various handheld devices sometimes place sample software modules on the Internet in order to encourage developers to build add-on utilities for their devices. The present invention modifies these modules to provide the functions within the O/S component driver 118. For example, another programmer may develop a set of libraries for adding phone numbers to a specific handheld device—the present invention takes those libraries and extend them to support the ability to move applications and data to and from that handheld device.

The build-to-order database 120 (FIG. 1) contains links of which handheld applications cannot coexist with each other, or are incompatible with specific handheld hardware, but also receives data from the Palm itself through the communication port 124 or 128 in order to assist in making such determinations.

Within the build-to-order database 120 exists a database catalog 121 which contains information about every handheld software product used within the present invention, including: what Operating System (O/S) version that product may require, the memory consumption of that product, what other software applications the product may be dependant upon, and other products/applications that it conflicts with. As the user adds items to her built-to-order system, the catalog 121 automatically checks each user-selected item to make sure it can be loaded on the selected device, that there is enough memory left to add the application, and that there are no other conflicts. If it fails any of these checks, an exception is caught by the database 120, and based on the exception an error message is displayed to the user through the user interfaces 200, 300 shown in FIGS. 2 and 3.

The products that are pre-loaded are all software, and the process does a complete load of the software onto the device—some software requires that the user enters some code or key to unlock the software. The present invention supports the ability to do post-load activities like enter registration keys. The present invention also supports pre-loading expansion memory cards (e.g. Compact Flash, Memory Stick, SecureDigital or SD, MultiMediaCard or MMC). For example, if a handheld device had 8 MB of RAM and a user wanted to load 12 MB of software, the system will either stop that user from adding applications once she hits the device's limit (8 MB), or if the device supports expansion memory via memory card, it will suggest adding one to her order. It would then preload some components onto the memory card, and others onto the device. Thus, the present invention gives preference to the memory card as this memory does not lose it's data when the batteries run down, and it tries to leave as much of the device's base memory free.

In addition to the items mentioned above, the database catalog 121 contains pricing information, supplier information, lead time (for physical items), descriptions, sales volume levels, product shots (images), and geographic sales restrictions (i.e. can this handheld device be sold in Europe, Russia, etc.). This information is obtained from the developers of the software. When adding software items to the catalog 121, the present invention has a list of parameters that must be collected for each piece of software. In some cases the developer will provide these parameters when they enter into an agreement to sell their software through the present invention. In other cases analysis on the software is required to properly configure the database catalog 121. All of the parameters need to be collected before the software can be activated or the dependency checker portion of catalog 121 will not function properly.

For hardware and accessories there are other parameters that are collected/entered but the process is similar—the parameters for the devices and accessories usually come from the detailed specifications provided by the manufacturer. The dependency checker ensures that all items are compatible based on the devices selected by the user, so she will not be able to add a Sony Memory Stick to a Palm m515 as they are not compatible—the Palm m515 uses a memory expansion called SD.

In the case of adding software to an existing device (not new) we are able to query the device to find out what software is currently loaded, how much memory is currently available, what name/ID has the user assigned to the device, etc. The software registration code component 113 is also managed by a separate abstracted software module 114. Each database catalog 121 item contains information about whether registration is required, and what type of registration mechanism the product uses. It also contains information about what information needs to be gathered from the user to complete the registration process. The registration module 114 then orchestrates the various registration methods to gather registration codes to deliver to the end user. Some common registration methods are (but not limited to):

pooled—the registration module 114 is given a pool of registration codes by the developer, and hand them out as required, when the pool runs low, it automatically generates a request to the developer for more codes, generated—the developer will supply an algorithm for generating registration codes. Each time a code is required the registration module 114 runs the algorithm to generate a code in real-time, and dynamically requested—the registration module 114 connects in real-time to the developer's systems and request codes for a given product. These each have many variations as each developer seems to have their own way of doing things, but the present invention masks most of this complexity from the end user.

This feature is actually mostly part of the website front-end portion 104 of the present invention. Because there is no standard among the developers for how to register software, users are often confused about what to do with their software. Some developers do not use any registration key, and rely on user honesty to not share their software, some use random numeric keys, some use 2 part keys, others user keys based on the user ID assigned to the device. For software only orders placed through the website front-end 104, the website will collect any information required for by the software to complete the registration/activation, and send the user any registration codes and instructions with their purchase confirmation. The list of information to collect and the resulting registration instructions are built dynamically based on the software selected by the user. So for example if a user purchases a title that requires no registration, that user will not be asked for any information, but if she selects 3 pieces of software, one that requires no registration, one that uses a random key, and one that is keyed on your device ID, during the checkout she will be asked to provide the device ID, and in her confirmation, there will be a section for the software that uses the random key, and what to do with it, and a section for the software that uses the device ID based key and how to use it, and nothing for the software that has no registration requirements.

All of these keys are delivered to the user with their software, so there is no need to communicate with each of the different developers after the sale to obtain the keys. Each registration code mechanism is supported by a module for that type of registration. The system allows for the present invention to have a theoretically infinite number of different registration schemes, so rather than having two or three supported methods, and trying to get the developers to modify their software to work that way, the present invention is adaptable to support almost any mechanism product developers can devise.

The process is similar with a pre-loaded device, except of course the software is pre-installed—as mentioned earlier the system will also support interacting with the software on the device post load to actually enter these keys.

Figure 2:
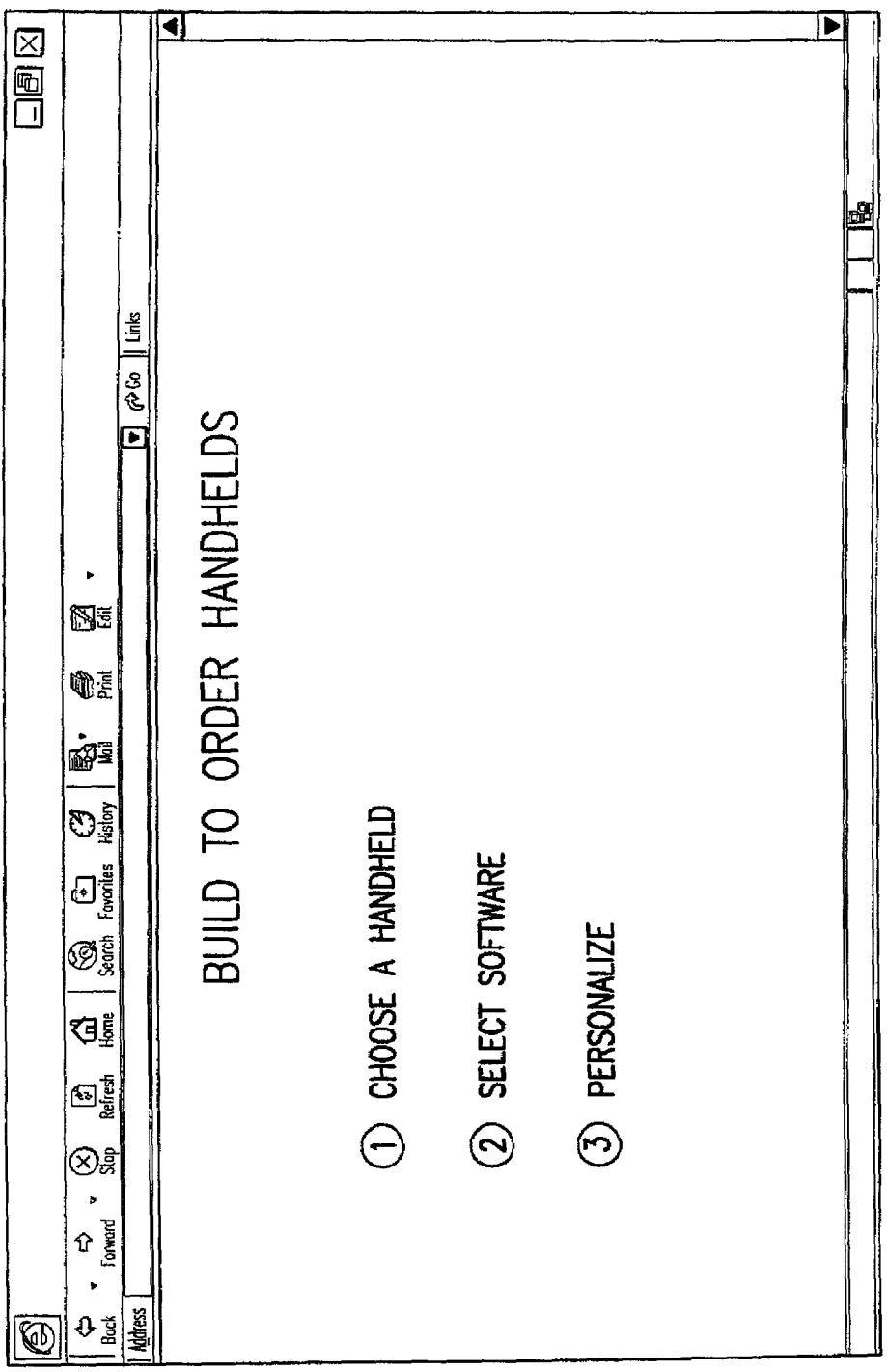
FIG. 2 is a screen capture showing the first screen presented to a user when first arriving at the web server of the present invention.
Figure 3:
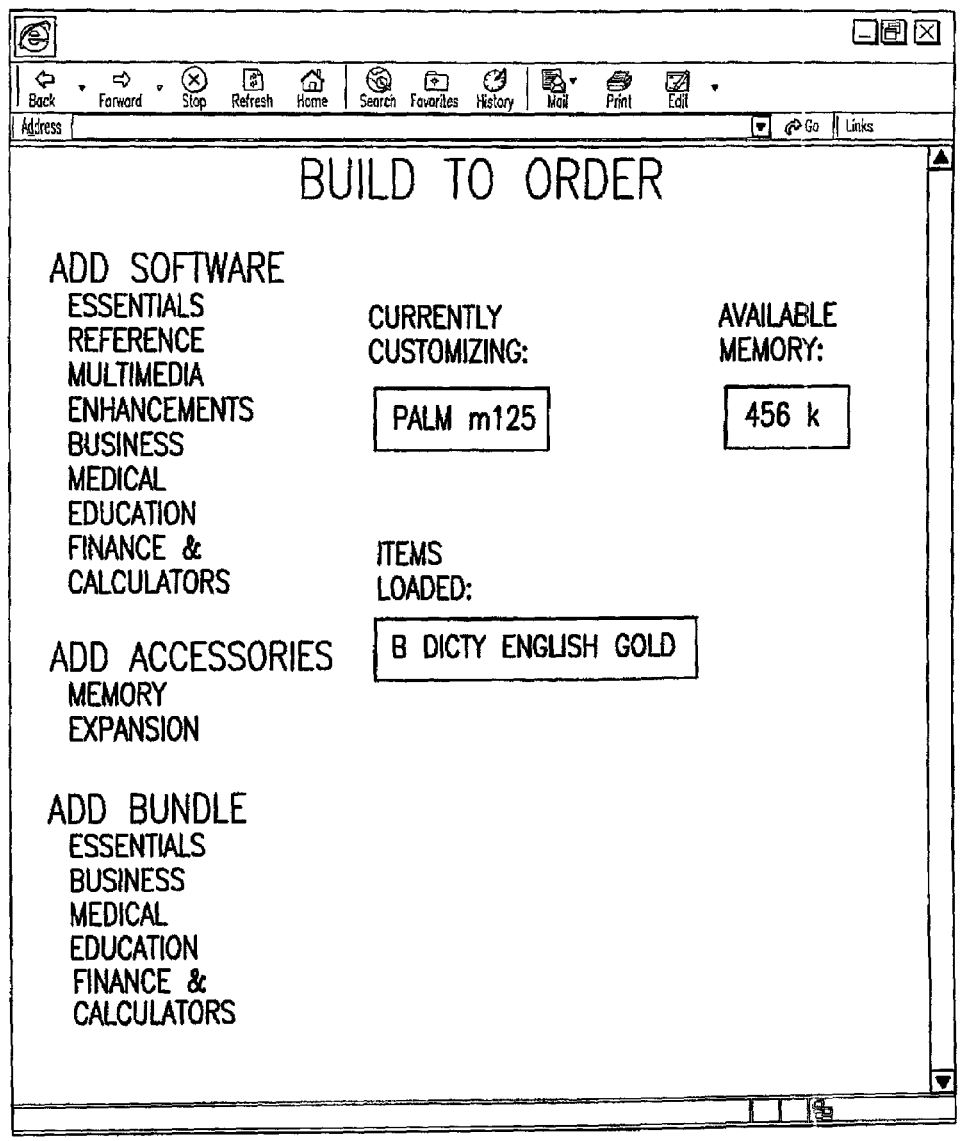
FIG. 3 is an additional screen capture showing further details available to the user through the web server connected to the present invention.

As shown in FIG. 2, the user interface 200 of the website engine 104 allows a user to choose a specific handheld device, select software for that device, and perform other personalized tasks. As shown in FIG. 3, through user interface 200 the website engine 104 communicates to the user which handheld device she is currently customizing, the amount of available memory on her customized device, and a list of the specific items she has selected.

It is not necessary that a user communicate with the present invention only through the Internet, however. The system is most powerfull for people who are purchasing new devices. However, a user can also send an existing device to a site where the present invention is located to have additional programs pre-loaded. A user could thus arrange to have an existing device upgraded using the present invention. An organization that uses a fleet of handheld devices could use the present invention to internally configure their own devices.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A system for configuring handheld devices, comprising:
    a website engine, for receiving user input;
    a build-to-order configuration engine for communicating with developers, coordinating software licensing, arranging software downloads and preventing conflicts;
    a database engine, for managing executable code and data responsive to said configuration engine, and
    a loading station for performing the actual downloads;
    wherein said loading station loads said handheld device based on user input received through said website engine and conveyed to said database and build-to-order configuration engines.

2. The system of claim 1, wherein said configuration engine communicates automatically with said developers using a registration module.

3. The system of claim 2, wherein said registration module communicates with said developers using either pooled, generated, or dynamically requested communications.

4. The system of claim 1, wherein said registration module supports the random-key method of software registration.

5. The system of claim 1, wherein said registration module supports the device-ID method of software registration.

6. The system of claim 1, wherein said loading station further comprises a transfer component, which transfers data back and forth over a physical medium through a port, and an operating system driver layer, which handles the actual moving of the bits through said port over said physical medium.

7. The system of claim 6, wherein said transfer component is abstracted such that it sees differing connection types as the same, because said operating system driver layer is responsible for the actual moving of the bits.

8. The system of claim 7, wherein software drivers of said connection types can be added to or removed from said loading station.

9. The system of claim 7, wherein software drivers of said connection types are extended from sample software modules obtained from product developers.

10. The system of claim 1, wherein said build-to-order configuration engine contains links of which handheld applications cannot coexist with each other or are incompatible with specific handheld hardware.

11. The system of claim 10, wherein said build-to-order configuration engine receives data from the handheld device itself through the communication port of said loading station.

12. The system of claim 10, wherein said build-to-order database further comprises a database catalog which contains information about a plurality of handheld software products, including what Operating System (O/S) version that product may require, the memory consumption of that product, what other software applications the product may be dependant upon, or any other products/applications that it conflicts with.

13. The system of claim 10, wherein said build-to-order database further comprises a database catalog which contains information about a plurality of handheld software products, including what Operating System (O/S) version that product may require, the memory consumption of that product, what other software applications the product may be dependant upon, or any other products/applications that it conflicts with.

14. The system of claim 1, wherein said database engine comprises a database catalog which contains handheld software pricing and supplier information, lead time, descriptions, sales volume levels, product shots (images).

15. The system of claim 14, wherein said database engine further comprises a dependency checker portion for comparing parameters related to each piece of software.

16. The system of claim 1, wherein said build-to-order configuration engine further comprises a plurality of registration code mechanisms each supported by a specialized registration module.

17. The system of claim 16, wherein said build-to-order configuration engine further comprises a plurality of registration code mechanisms which can complete the registration process even when all software is preloaded on the handheld device.

18. The system of claim 1, wherein a customer sends an existing handheld device to a location having a build-to-order configuration engine, a database engine, and a loading station, wherein said customer accomplishes all download registrations without using said website engine.

19. A method of loading software onto a handheld device, comprising:

querying a build-to-order configuration engine to ensure sufficient memory is available to accommodate said software, that the desired software has no conflicts with any other software desired by said user, and that the handheld device O/S (Operating System) can accommodate said software;

querying said handheld device to ensure sufficient memory is available, and reporting an error back to said user if necessary;

if necessary, prompting a user to order additional memory such as on a memory card; and locating said software program on said memory card where possible.

* * * * *